(12) United States Patent
Engel et al.

(10) Patent No.: US 10,605,826 B2
(45) Date of Patent: Mar. 31, 2020

(54) CALIBRATING TIP-ENHANCED RAMAN MICROSCOPES

(71) Applicants: International Business Machines Corporation, Armonk, NY (US); Universidade Federal de Minas Gerais (UFMG), Belo Horizonte (BR)

(72) Inventors: Michael Engel, Rio de Janeiro (BR); Mathias Steiner, Rio de Janeiro (BR); Ado Jorio de Vasconcelos, Belo Horizonte (BR); Cassiano Rabelo, Belo Horizonte (BR); Luiz Gustavo Cancado, Belo Horizonte (BR); Hudson Miranda, Belo Horizonte (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/010,500

(22) Filed: Jun. 17, 2018

(65) Prior Publication Data

US 2019/0383854 A1 Dec. 19, 2019

(51) Int. Cl.
*G01Q 40/00* (2010.01)
*G01Q 60/18* (2010.01)
*G01J 3/44* (2006.01)

(52) U.S. Cl.
CPC .............. *G01Q 40/00* (2013.01); *G01J 3/44* (2013.01); *G01Q 60/18* (2013.01)

(58) Field of Classification Search
CPC ........ G01Q 40/00; G01Q 40/02; G01Q 60/18; G01J 3/22; G01J 3/44; G01J 3/4412
See application file for complete search history.

(56) References Cited

U.S. PATENT DOCUMENTS

| 6,016,684 A | 1/2000 | Scheer et al. |
| 2004/0089816 A1* | 5/2004 | Quake ............... G01Q 30/04 250/458.1 |
| 2014/0043607 A1* | 2/2014 | Wang ................ G01N 21/65 356/301 |

OTHER PUBLICATIONS

Suzuki et al. 'Tip-enhanced Raman spectroscopic measurement of stress change in the local domain of epiaxial graphene on the carbon face of 4H—SiC(000-1)' Aug. 7, 2014, Phys Chem Chem Phys, 16, 20236-20240 (Year: 2014).*

(Continued)

*Primary Examiner* — Eliza W Osenbaugh-Stewart
(74) *Attorney, Agent, or Firm* — Joseph Petrokaitis; Otterstedt, Wallace & Kammer, LLP

(57) ABSTRACT

A calibration apparatus for a tip-enhanced Raman microscope includes a substrate; a two-dimensional Raman scatterer that is mounted on an upper surface of the substrate; and a well-defined topographic structure that is formed at the upper surface of the substrate. The topographic structure may include convex geometric shapes such as triangles and squares arranged in one or more periodic lattices. Calibration is via adjusting a focal length of a laser beam until a signal from a spectrometer repeatedly exhibits a stepped response when a focal point of the laser beam traverses an edge of a two-dimensional Raman scatterer, then adjusting the relative lateral positions of a scanning probe microscope probe tip and the focal point until the signal from the spectrometer and a signal from the scanning probe microscope repeatedly change within an acceptable time delay while the focal point and the probe tip traverse edges of the topographic structure.

8 Claims, 7 Drawing Sheets

(56) References Cited

OTHER PUBLICATIONS

Hirata et al., 'Tip-Enhanced Raman Scattering Spectroscopy of Nanometer-Scale Domains in Ni(110)-(2x1) O Surface' 2009, Jpn. J Appl Phys, 48, 110206 (Year: 2009).*

Yu et al., 'Far-field free tapping-mode tip-enhanced Raman microscopy' 2013, Appl. Phy Lett, 102, 123110 (Year: 2013).*

Ryan Beams et al., "Spatial Coherence in Near-Field Raman Scattering", Phys. Rev. Lett.113, 186101. Oct. 2014. pp. 1-8.

Palash Bharadwaj et al., "Optical Antennas", Advances in Optics and Photonics 1, Aug. 2009. pp. 438-483.

Luis Gustavo Cançado et al., "Theory of Spatial Coherence in Near-Field Raman Scattering", Phys. Rev. X 4, 031054. Sep. 2014. pp. 1-14.

S. Cherukulappurath et al., "Template-stripped asymmetric metallic pyramids for tunable plasmonic nanofocusing", Nano Lett. 2013;13(11). Oct. 2013. pp. 5635-5641 (Abstract Only 1 Page).

Timothy W. Johnson et al., "Highly Reproducible Near-Field Optical Imagingwith Sub-20-nm Resolution Based on Template-Stripped Gold Pyramids", ACS Nano 2012 vol. 6 ' No. 10. Aug. 2012. pp. 9168-9174.

Ado Jorio et al., "Symmetry-derived selection rules for plasmon-enhanced Raman scattering." Physical Review B 95.15 (2017): 155409. Apr. 2017. pp. 1-25.

V.L. Mironov, "Fundamentals of Scanning Probe Microscopy", Russian Academy of Sciences, Institute for Physics of Microstructures, Nizhniy Novgorod. Jan. 2004. pp. 1-98.

Raoul M. Stöckle et al., "Nanoscale chemical analysis by tip-enhanced Raman spectroscopy". Chem. Phys. Lett. 318. Feb. 2000. pp. 131-136.

Zhenglong Zhang et al., "Tip-enhanced Raman spectroscopy", Anal. Chem. 2016, 88. Aug. 2016. pp. 9328-9346.

* cited by examiner

ILLUSTRATION OF CONFOCAL MEASUREMENT (OUT OF FOCUS)

ILLUSTRATION OF CONFOCAL MEASUREMENT (IN FOCUS)

CALIBRATING TIP-ENHANCED RAMAN MICROSCOPES

BACKGROUND

The present invention relates to materials science, and more specifically, to tip-enhanced Raman microscopy.

Raman spectroscopy is a technique for characterizing the chemical composition of a material sample by illuminating the sample with a laser beam and detecting a shift in the wavelength of the light scattered from the sample. Raman spectroscopy makes use of the physical phenomenon known as "Raman scattering" or "inelastic scattering", in which the incident light interacts with the rovibronic (rotational-vibrational) modes of molecules without altering the energy states of electrons in the molecules. Raman scattering is a relatively weak phenomenon compared to fluorescence, in which the electron energy states are altered. Because Raman scattering is relatively weak, it is difficult to detect in small samples.

Tip-enhanced Raman microscopy (TERM) is an advanced optical technique in which sample material is deposited on a surface and an atomically small metal probe (e.g., the tip of a scanning probe microscope (SPM) such as a scanning-tunneling microscope (STM) or atomic force microscope (AFM)) is brought close to the surface in conjunction with the focal point of the laser light. The frequency of the incident laser light is selected to be resonant with the plasma frequency of the metal probe, so that the probe tip functions as a plasmonic nanoantenna; thereby, the intensity of the incident laser light and of the scattered light of the sample material is amplified (for relatively small wavelength shifts). This makes it easier to detect the Raman scattered light, which enables characterizing the chemical composition of relatively small samples (potentially as small as single molecules).

SUMMARY

Principles of the invention provide techniques for calibrating tip-enhanced Raman microscopes. In one aspect, an exemplary method includes adjusting a focal length of a laser beam until a signal from a spectrometer repeatedly exhibits a stepped response when a focal point of the laser beam traverses an edge of a two-dimensional Raman scatterer, and adjusting relative lateral positions of a scanning probe microscope probe tip and the focal point of the laser beam until the signal from the spectrometer and a signal from the scanning probe microscope repeatedly change within an acceptable time delay while the focal point and the probe tip traverse edges of a well-defined topographic structure.

In another aspect, an exemplary apparatus includes a substrate; a two-dimensional Raman scatterer that is mounted on an upper surface of the substrate; and a well-defined topographic structure that is formed at the upper surface of the substrate.

In another aspect, an exemplary computer readable storage medium is encoded with instructions that when executed by a processor cause the processor to facilitate: adjusting a focal length of a laser beam and traversing a focal point of the laser beam across an edge of a two-dimensional Raman scatterer while observing a signal from a spectrometer, until the signal from the spectrometer repeatedly exhibits a stepped response when the focal point traverses the edge of the two-dimensional Raman scatterer; and traversing a probe tip of a scanning probe microscope and the focal point of the laser beam across a well-defined topographic structure and adjusting the relative lateral positions of the probe tip and the focal point, while observing the signal from the spectrometer and a signal from the scanning probe microscope, until the signal from the spectrometer and the signal from the scanning probe microscope repeatedly change within an acceptable time delay while the focal point and the probe tip traverse edges of the topographic structure.

In view of the foregoing, techniques of the present invention can provide substantial beneficial technical effects. For example, one or more embodiments provide a simple platform for the calibration of a TERM equipment, thus making possible not only the development of well-calibrated TERM procedures, but also the development of the TERM technique itself.

These and other features and advantages of the present invention will become apparent from the following detailed description of illustrative embodiments thereof, which is to be read in connection with the accompanying drawings.

DETAILED DESCRIPTION

The light amplification of tip-enhanced Raman spectroscopy depends upon precisely aligning the focal point of a laser beam (with a diameter on the order of 100-400 nanometers (nm)) to the probe tip of an SPM (with a diameter on the order of 20-30 nm). This can be difficult to accomplish and as a result it can be difficult to obtain high spatial resolution or repeatable measurements using TERM. A pertinent challenge in some instances is to repeatably calibrate a tip-enhanced Raman microscope so that it will give precise and repeatable measurements. Accordingly, aspects of the invention provide for calibrating tip-enhanced Raman microscopes using a special nano-structure that provides precise feedback regarding the relative locations of a laser beam focal point and an SPM probe tip.

Figure 1:
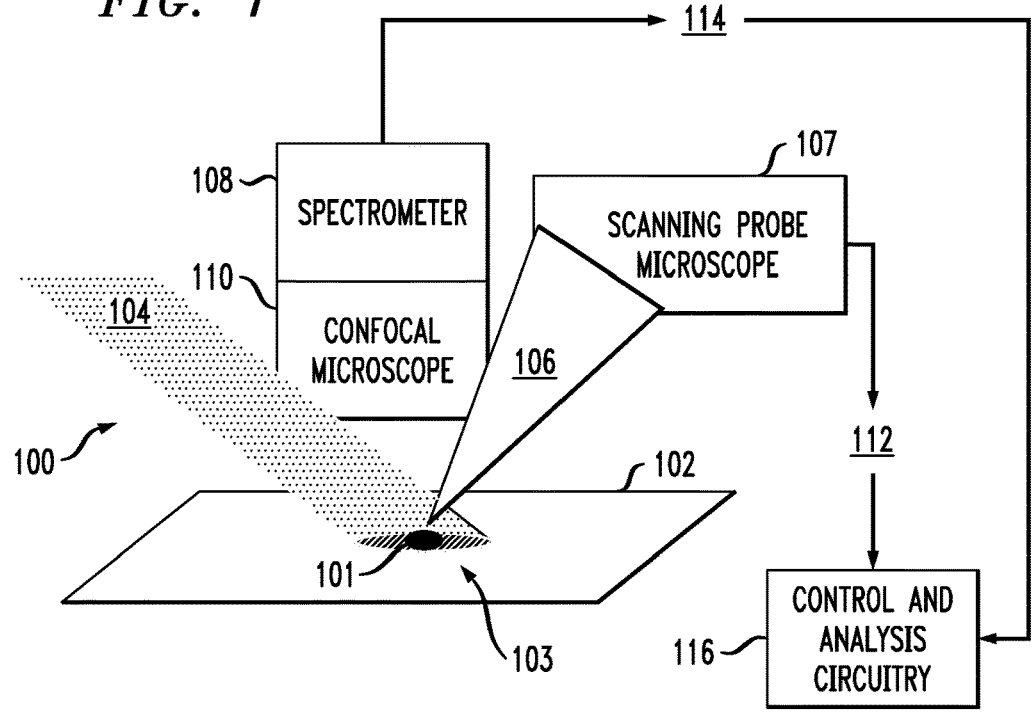
FIG. 1 depicts a side-illuminated setup for tip-enhanced Raman spectroscopy.

In this regard, FIG. 1 depicts a side-illuminated setup 100 for tip-enhanced Raman spectroscopy. According to the setup 100, a sample 101, mounted on a substrate 102, is illuminated at a focal point 103 by a laser beam 104 shining from above the substrate, while a probe tip 106 of an SPM 107 is positioned closely adjacent the focal point. A spectrometer 108 picks up light scattered from the focal point via a confocal microscope 110. The SPM 107 and the spectrometer 108 produce signals 112, 114 that are collected by control and analysis circuitry 116.

Figure 2:
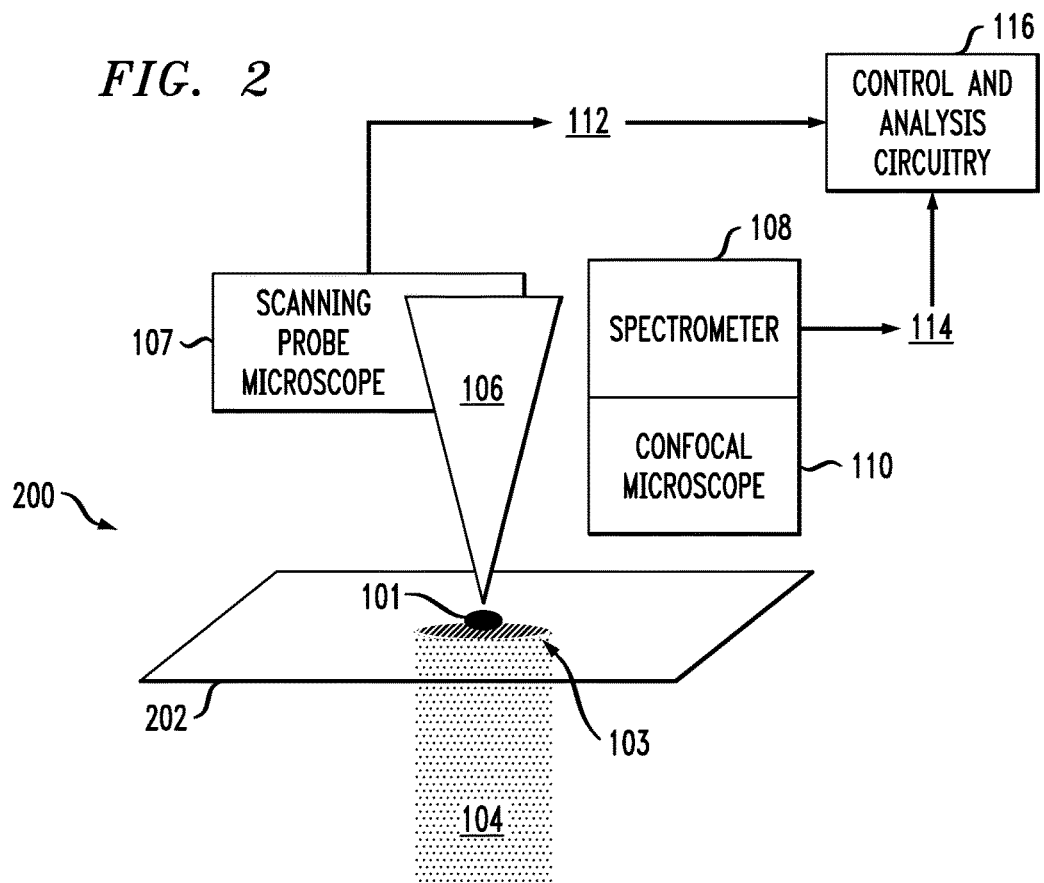
FIG. 2 depicts a bottom-illuminated setup for tip-enhanced Raman spectroscopy.

FIG. 2 depicts a bottom-illuminated setup 200 for tip-enhanced Raman spectroscopy. According to the setup 200, the sample 101, mounted on a substrate 202, is illuminated at the focal point 103 by the laser beam 104 shining through the substrate, while a probe tip 106 of an SPM 107 is positioned closely adjacent the focal point. A spectrometer 108 picks up light scattered from the focal point via a confocal microscope 110. The SPM 107 and the spectrometer 108 produce signals 112, 114 that are collected by control and analysis circuitry 116. The principal difference between the setup 100 and the setup 200 is that in the setup 200 the substrate 202 is transparent to the laser beam 104. In both setups, the substrates 102, 202 exhibit different Raman scattering spectra than the sample 101.

Figure 3:
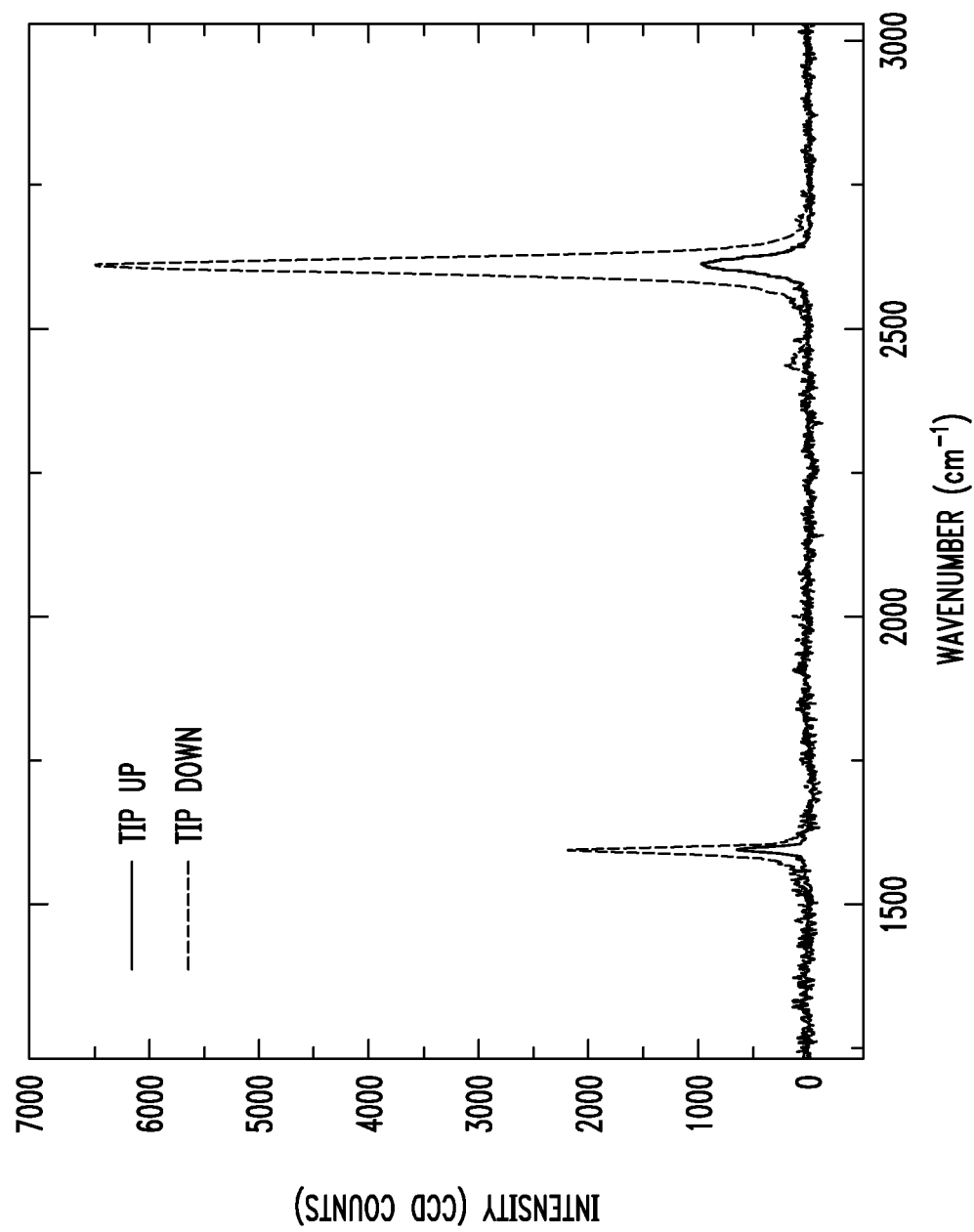
FIG. 3 depicts optical enhancement of Raman scattering by positioning a probe tip close to a roughened metal surface.

FIG. 3 depicts optical enhancement of Raman scattering by positioning a probe tip close to laser beam focal point. The lower curve in FIG. 3 (solid or "Tip up") depicts the Raman wavelength shift and intensity of light scattered from a sample on the surface when an SPM probe tip is distant from the focal point, e.g., greater than 10 nanometer (nm) above a surface where the focal point is focused. The upper curve in FIG. 3 (dashed or "Tip down") depicts the Raman wavelength shift and intensity of light scattered from the sample when the SPM probe tip is near to the surface, e.g., less than 10 nm above the surface.

Figure 4:
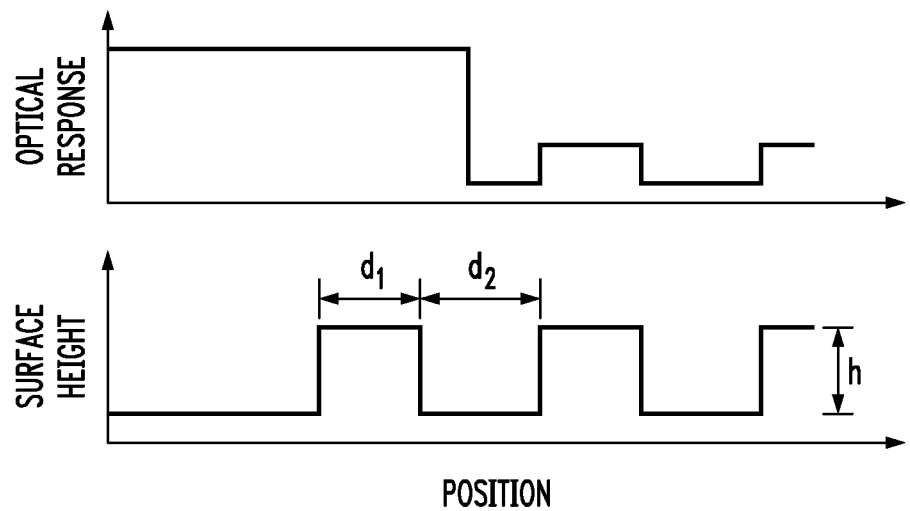
FIG. 4 depicts correlation of optical response to height of a surface under the probe of a Raman microscope.

FIG. 4 depicts correlation of optical response to height of a surface for a tip-enhanced Raman microscope that is initially uncalibrated and becomes calibrated. At the left side of the figure there is no optical response to the varying surface height because the microscope has not been calibrated. Toward the right side of the figure the optical response begins to track the varying surface height because the microscope has been calibrated.

Figure 5:
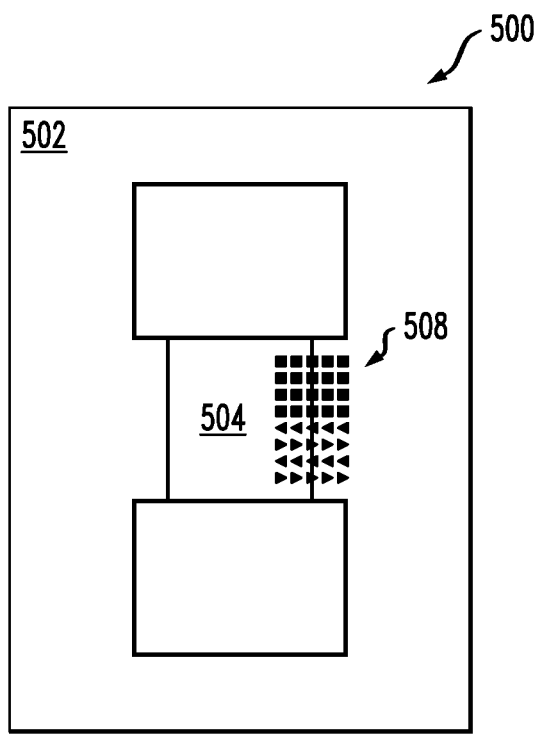
FIG. 5 depicts a plan view of an apparatus for calibrating tip-enhanced Raman microscopes, according to an exemplary embodiment.
Figure 6:
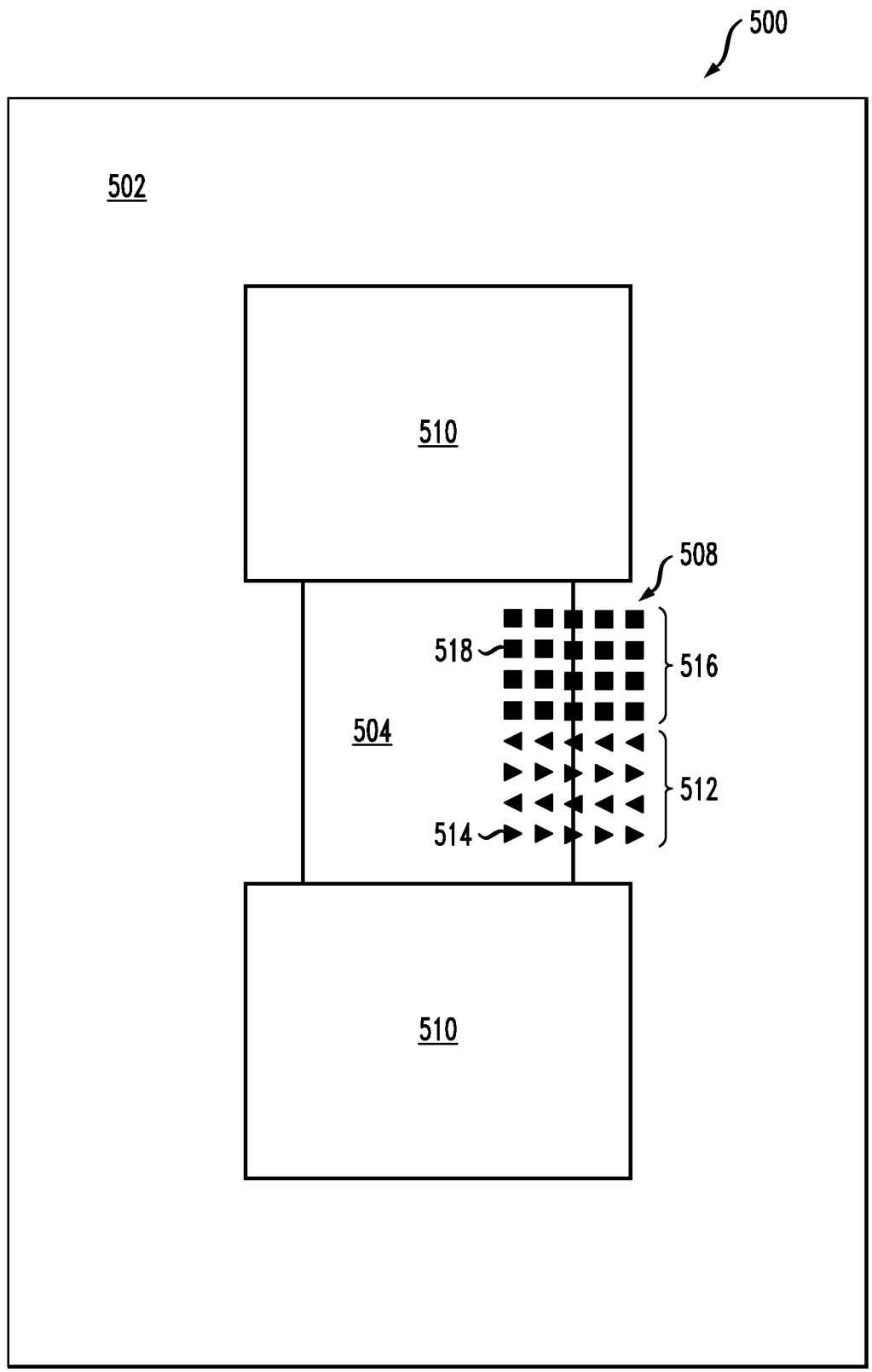
FIG. 6 depicts a detail view of the apparatus of FIG. 5.

FIG. 5 depicts a plan view of an apparatus 500 for calibrating tip-enhanced Raman microscopes, according to an exemplary embodiment. FIG. 6 depicts a detail view of the apparatus 500. The apparatus 500 includes a substrate 502, a two-dimensional Raman scatterer 504 that is mounted on an upper surface of the substrate, and a topographic structure 508 that is formed at the upper surface of the substrate near the two-dimensional Raman scatterer. In one or more embodiments, the substrate 502, the two-dimensional Raman scatterer 504, and the topographic structure 508 each exhibit different Raman scattering spectra. The two-dimensional Raman scatterer 504 and the topographic structure 508 serve two distinct purposes in calibrating a tip-enhanced Raman microscope. The scatterer 504 is used for confirming and optimizing optical enhancement of the laser beam 104 by adjusting the laser beam focal length, while the structure 508 is used for mutual lateral alignment of the laser beam focal point with the metallic probe tip.

If the system is configured according to FIG. 1, the substrate 102/502 can be made of any material that does not have an optical response in the same range as the sample being measured (e.g., silicon, glass, sapphire, plastic). If the system is configured according to FIG. 2, the substrate 202/502 should be made of glass, fused quartz or other media transparent to visible light. Contact panels 510 for STM are provided in case SPM is utilized in the STM mode, for current drain.

In one or more embodiments, the two-dimensional Raman scatterer 504 comprises a graphene sheet. In one or more embodiments, the two-dimensional Raman scatterer 504 comprises nanotubes, nanowires, molybdenum disulfide, molybdenum diselenide, or black phosphorus.

In one or more embodiments, the topographic structure 508 overlaps the two-dimensional Raman scatterer 504. In other embodiments, the topographic structure 508 is disposed adjacent to but not overlapping the two-dimensional Raman scatterer. In one or more embodiments, the topographic structure 508 includes protrusions from the upper surface of the substrate 502. In one or more embodiments, the topographic structure 508 includes indentations into the upper surface of the substrate 502. In one or more embodiments, the topographic structure 508 includes a first periodic pattern 512 of first shapes 514. In one or more embodiments, the topographic structure 508 also includes a second periodic pattern 516 of second shapes 518 that are different than the first shapes 514. For example, the first shapes 514 are triangles while the second shapes 518 are squares. In one or more embodiments, edges of the shapes 514, 518 are well-defined, i.e. the edges exhibit a height change of at least 10 nanometers (nm) within a lateral distance of no more than 1 nm. In one or more embodiments, the shapes 514, 518 are positioned to define regular lattices 512, 516 in which the shapes are of uniform size and uniformly spaced apart. For example, in an embodiment the topographic structure 508 includes the first periodic pattern 512 consisting of equilateral triangles 514 that are 10-100 nm on each side; the triangles 514 are arranged in alternating rows with adjacent rows pointing in opposite directions, with 10-100 nm gaps between adjacent triangles along each row and with 10-100 nm gaps between the rows. In another embodiment, the triangles 514 can be arranged in a hexagonal lattice. In another embodiment the topographic structure 608 also includes the second periodic pattern 516 consisting of squares 518 that are 10-100 nm on each side, arranged in a rectangular grid with 10-100 nm gaps between adjacent squares. In another embodiment, the squares 518 can be arranged in staggered rows.

Figure 7:
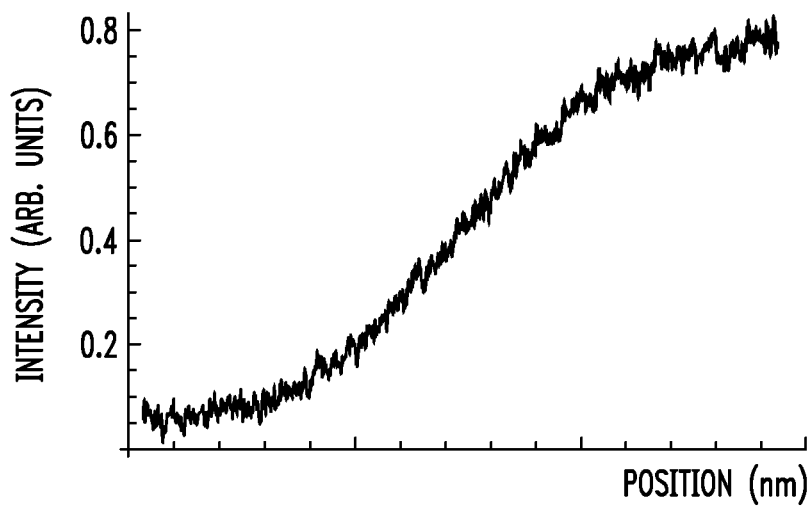
FIG. 7 depicts optical response as a function of position for an out-of-focus tip-enhanced Raman microscope scanning a well-defined edge structure.
Figure 8:
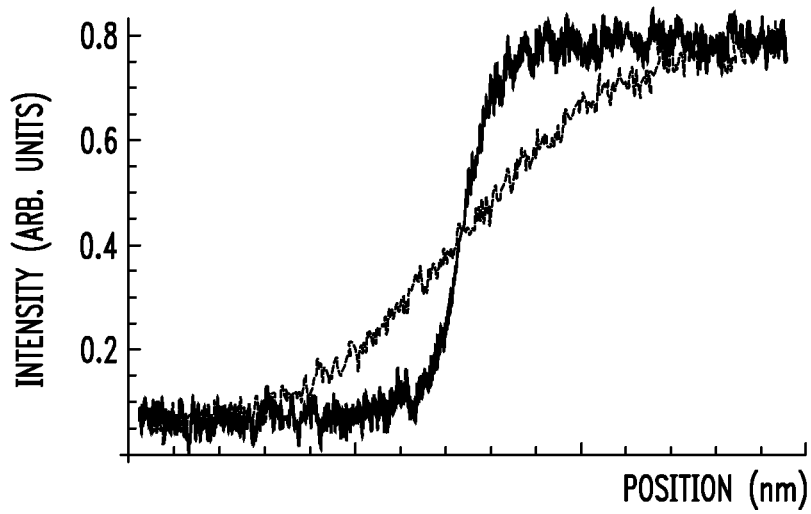
FIG. 8 depicts optical response as a function of position for an in-focus tip-enhanced Raman microscope scanning the well-defined edge structure.

FIG. 7 depicts optical response as a function of position for an out-of-focus tip-enhanced Raman microscope scanning a well-defined edge structure (laser focal point not aligned to the plane of the edge structure). The detected intensity of scattered light exhibits a gradual and substantially linear slope across the edge structure. By contrast, FIG. 8 depicts optical response as a function of position for an in-focus tip-enhanced Raman microscope scanning the well-defined edge structure (laser focal point aligned to the plane of the edge structure). The detected intensity of scattered light exhibits a stepped response across the well-defined edge structure, e.g., a change of no less than 10 to 1 signal to noise ratio (i.e. intensity maximum/intensity minimum) within a distance of no more than 30 nm (approximately one probe tip diameter), which is the current best resolution of tip-enhanced Raman microscopy.

Figure 9:
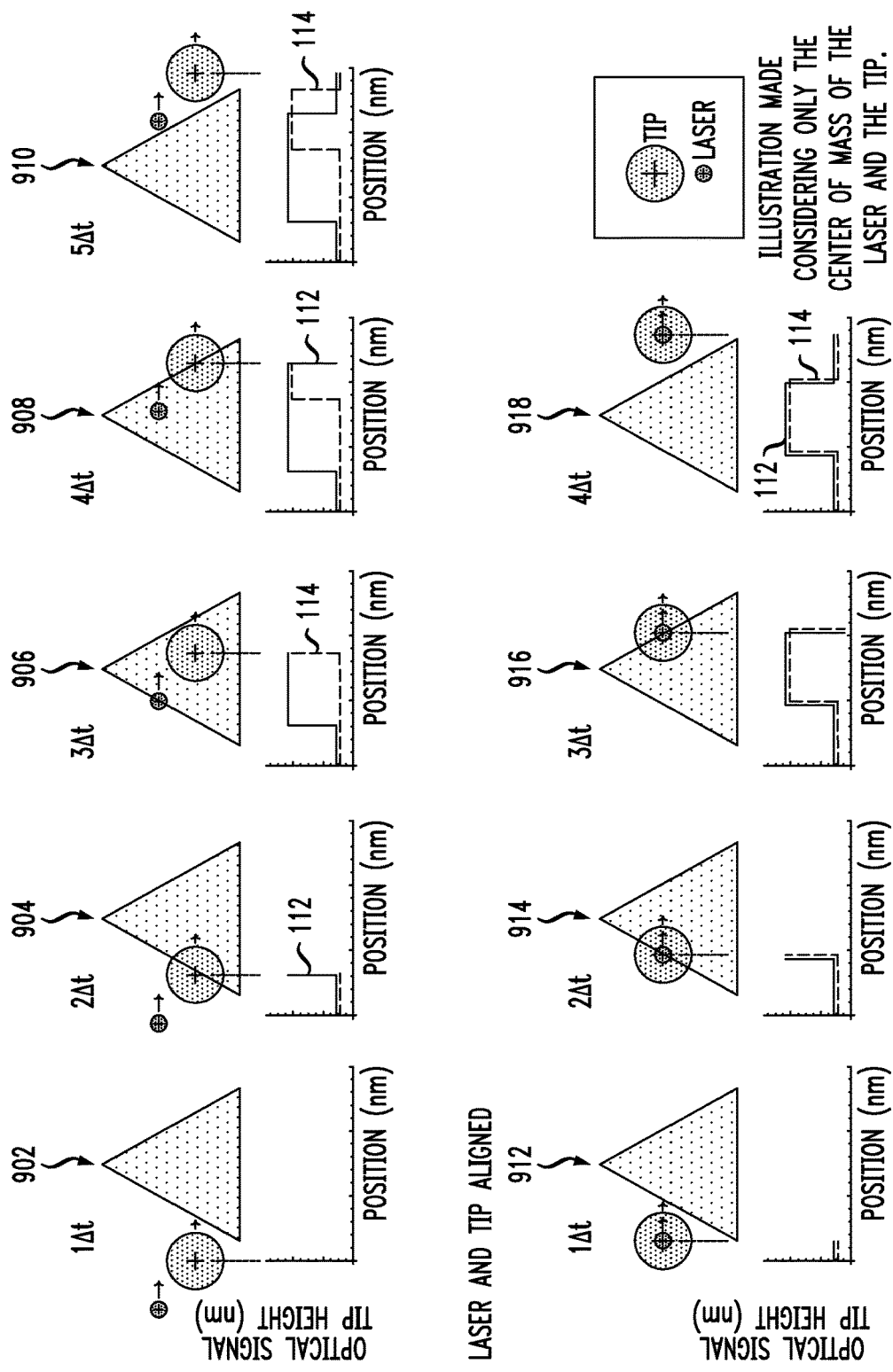
FIG. 9 depicts optical response and SPM response as a function of position for out-of-focus and in-focus tip-enhanced Raman microscopes scanning a triangular portion of the apparatus of FIG. 5.

FIG. 9 depicts optical response and SPM response as a function of position for out-of-focus and in-focus tip-enhanced Raman microscopes scanning a triangular portion of the apparatus of FIG. 5.

First considering the out-of-focus responses, at 902 (1.delta.t), the laser focal point 103 is laterally offset from the probe tip 106. Note that for illustrative purposes the entire probe cross section is shown rather than just the tip, therefore, the probe appears larger than the laser focal point. The actual probe tip 106 is shown by the cross mark. The probe tip 106 already is approaching one of the triangles 514 while the laser focal point 103 still is distant from the triangle (the probe tip, laser focal point, and triangle(s) are not numbered in FIG. 9, to avoid clutter). At 904 (2.delta.t), the probe tip 106 overlaps an edge of the triangle 514 while the laser focal point 103 still has not reached the triangle. Accordingly, the SPM signal 112 is high (exhibits a positive response) while the spectrometer signal (not numbered in view 904) exhibits no response. At 906 (3.delta.t), the probe tip 106 still is over the triangle 514 and the SPM signal 112 (not numbered in view 906) remains high while the laser focal point 103 has just reached the edge of the triangle and the spectrometer signal 114 is stepping high. Note that FIG. 9 shows a spectrometer signal 114 for the laser focal point 103 being in-plane with the topographic structure 508; an out-of-plane signal would be more of a ramped shape than a step shape. At 908 (4.delta.t), the probe tip 106 is exiting the triangle 514 and the SPM signal 112 is stepping low while the laser focal point 103 is over the triangle and the spectrometer signal 114 (not numbered in view 908) is high. At 910 (5.delta.t), both the probe tip 106 and the laser focal point 103 have exited the triangle and both the SPM signal 112 (not numbered in view 910) and the spectrometer signal 114 are low. At each stage of this sequence, there is a temporal offset between changes in the SPM signal 112 and changes in the spectrometer signal 114 that correlates to the lateral spatial offset between the probe tip 106 and the laser focal point 103.

By contrast, consider the in-focus responses. At 912 (1.delta.t), both the laser focal point 103 and the probe tip 106 are distant from the triangle 514 and both the spectrometer signal 114 (not numbered in views 912, 914, 916) and the SPM signal 112 (not numbered in views 912, 914, 916) are low. At 914 (2.delta.t), both the laser focal point 103 and the probe tip 106 cross an inward edge of the triangle 514 and both signals 112, 114 change (step high) together, within an acceptable time delay. At 916 (3.delta.t), both the laser focal point 103 and the probe tip 106 cross an outward edge of the triangle 514 and the signals 112, 114 change (step low) together. Because the laser focal point 103 is laterally aligned with the probe tip 106, there is little or no temporal offset between the SPM signal 112 and the spectrometer signal 114. For example, in one or more embodiments the signals are substantially matched in time, e.g., there is less than 1 milliseconds temporal offset between the signals at an SPM traverse speed of 20 micrometers per second (this scales linearly with increasing temporal offset). At 918 (4.delta.t), both the probe tip 106 and the laser focal point 103 have exited the triangle and both the SPM signal 112 and the spectrometer signal 114 are low.

Figure 10:
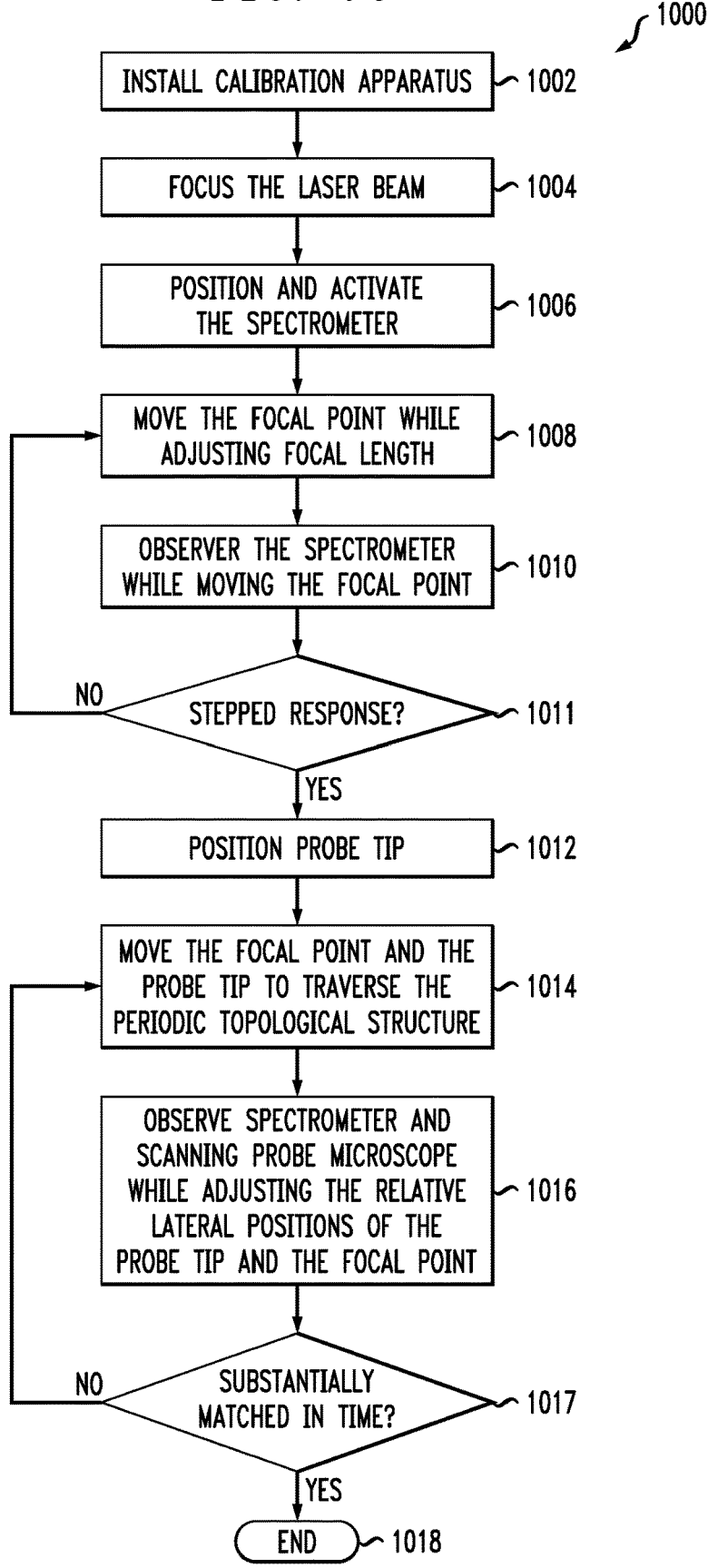
FIG. 10 depicts method steps of a calibration sequence using the apparatus of FIG. 5.

FIG. 10 depicts method steps of a calibration sequence 1000 using the apparatus 500 of FIG. 5. The following discussion of the method steps incorporates reference numbers for structural components shown in FIGS. 1 and 5. At 1002, install the calibration apparatus 500 on a sample platform of a scanning-probe microscope. At 1004, focus the laser beam 104 on the focal point 103 adjacent to the upper surface of the substrate 502 of the calibration apparatus. At 1006, position and activate the spectrometer 108 to detect light scattered from the focal point 103. At 1008, repeatedly move the calibration apparatus 500 so that the focal point 103 traverses the apparatus in a direction parallel to the upper surface of the substrate 502 and repeatedly crosses an edge of the two-dimensional Raman scatterer 504. At 1010, repeatedly observe the signal 114 from the spectrometer 108, while moving the apparatus 500 to traverse the focal point 103 and also adjusting the focal length of the laser beam 104, until the signal from the spectrometer repeatably exhibits a stepped response (decision block 1011; continue to step 1012 if observed else return to step 1008) when the focal point crosses the edge of the two-dimensional Raman scatterer 504. In one or more embodiments, a stepped response across the edge structure is defined as a change of no less than 10 to 1 signal to noise ratio within a distance of no more than 30 nm; other embodiments may have different characteristics. At 1012, position the probe tip 106 of the scanning probe microscope 107 adjacent to the upper surface of the substrate 502 adjacent to the focal point 103 (in this context, "adjacent" suggests within fewer than two multiples of the probe diameter). At 1014, repeatedly move the probe tip 1016 relative to the focal point 103 while moving the calibration apparatus such that the focal point and the probe tip repeatedly traverse the topographic structure 508. At 1016, repeatedly observe the signal 114 from the spectrometer 108 and the signal 112 from the scanning probe microscope 107, while traversing the topographic structure and adjusting the relative lateral positions of the probe tip and the focal point, until the signal from the spectrometer and the signal from the scanning probe microscope repeatedly change within an acceptable time delay from each other. What is an acceptable time delay may vary according to SPM traverse speed and desired spatial resolution of the TERM. Thus, an endpoint of the foregoing procedure may be determined by operator preference. For example, in one or more embodiments an acceptable time delay may be such that the two signals are substantially matched in time, e.g., exhibiting upward signals within no more than 1 millisecond of each other (as per decision block 1017; if not matched, return to step 1014, else end at 1018) while the focal point and the probe tip traverse the topographic structure.

Notably, at least in embodiments in which the topographic structure 508 includes multiple protrusions or indentations, angular orientation of the calibration apparatus 500 with reference to the traverse direction of the laser beam 104 and the probe tip 106 can be estimated by comparing the actual signals 112, 114 to signals predicted based on a model of the topographic structure 508. Furthermore, it is possible using the calibration apparatus 500 to perform an in-situ inspection of probe tip radius by ascertaining the lateral dimension in which the probe tip 106 responds to the edge of the well-defined structure 508. This is possible from the measured topography. The measured topographical signal is a convolution of tip radius and the scanned edge. Because the edge geometry is at least approximately known, it is possible to de-convolute the measured signal to extract a good estimate of the tip radius.

Given the discussion thus far, it will be appreciated that, in general terms, an exemplary method, according to an aspect of the invention, includes adjusting a focal length of a laser beam 104 until a signal 114 from a spectrometer 108 repeatedly exhibits a stepped response when a focal point 103 of the laser beam traverses an edge of a two-dimensional Raman scatterer 504, and adjusting relative lateral positions of a scanning probe microscope probe tip 106 and the focal point of the laser beam until the signal from the spectrometer and a signal 112 from the scanning probe microscope 107 repeatedly change within an acceptable time delay while the focal point and the probe tip traverse edges of a well-defined topographic structure 508. In one or more embodiments the exemplary method also includes installing a calibration apparatus 500 on a sample platform of the scanning probe microscope 107, wherein the calibration apparatus comprises a substrate 502, the two-dimensional Raman scatterer 504 that is mounted on an upper surface of the substrate, and the well-defined topographic structure 508 that is formed at the upper surface of the substrate. In one or more embodiments the exemplary method also includes focusing the laser beam 104 at the focal point 103 near the upper surface of the substrate 502; positioning and activating the spectrometer 108 to detect light scattered from the focal point; and observing the signal from the spectrometer, while repeatedly traversing the focal point across an edge of the two-dimensional Raman scatterer 504 and adjusting the focal length of the laser beam. In one or more embodiments the exemplary method also includes positioning a probe tip 106 of the scanning probe microscope 107 near to the upper surface of the substrate 502 and laterally adjacent to the focal point 103, and observing the signal from the spectrometer 108 and the signal from the scanning probe microscope 107, while traversing the topographic structure 508 with the probe tip and the focal point and adjusting the relative lateral positions of the probe tip and the focal point. In one or more embodiments the topographic structure is periodic. In one or more embodiments the exemplary method includes repeatedly traversing the topographic structure. In one or more embodiments the exemplary method further includes estimating an angular orientation of the calibration apparatus with reference to a traversal direction of the probe tip and the focal point. In one or more embodiments, the acceptable time delay is such that the signal from the spectrometer and the signal from the scanning probe microscope are substantially matched in time.

An exemplary apparatus 500, according to other aspects of the invention, includes a substrate 502; a two-dimensional Raman scatterer 504 that is mounted on an upper surface of the substrate; and a well-defined topographic structure 508 that is formed at the upper surface of the substrate. In one or more embodiments the two-dimensional Raman scatterer comprises a graphene sheet. In other embodiments the two-dimensional Raman scatterer comprises at least one of: nanotubes, nanowires, molybdenum disulfide, molybdenum diselenide, black phosphorus. In one or more embodiments the topographic structure comprises symmetric convex geometric shapes 514, 518 arranged in a periodic lattice. In one or more embodiments the periodic lattice comprises a first lattice 512 of identical first shapes 514 and a second lattice 516 of identical second shapes 518, wherein the first shapes are not the same as the second shapes. In one or more embodiments the identical first shapes 514 are triangles. In one or more embodiments the identical second shapes 518 are squares. In one or more embodiments the triangles 514 are between 10 and 100 nanometers across. In one or more embodiments the triangles 514 are separated by gaps of between 10 and 100 nanometers. In one or more embodiments the topographic structure 508 is disposed adjacent to the two-dimensional Raman scatterer 504. In other embodiments the topographic structure 508 overlaps the two-dimensional Raman scatterer 504. In one or more embodiments the apparatus also includes scanning-tunneling microscopy contacts 510 adjacent to the two-dimensional Raman scatterer 504.

According to other aspects of the invention, an exemplary computer readable storage medium is encoded with instructions that when executed by a processor cause the processor to facilitate: adjusting a focal length of a laser beam 104 and traversing a focal point 103 of the laser beam across an edge of a two-dimensional Raman scatterer 504 while observing a signal from a spectrometer 108, until the signal from the spectrometer repeatedly exhibits a stepped response when the focal point traverses the edge of the two-dimensional Raman scatterer; and traversing a probe tip 106 of a scanning probe microscope 107 and the focal point 103 of the laser beam 104 across a well-defined topographic structure 508 and adjusting the relative lateral positions of the probe tip and the focal point, while observing the signal from the spectrometer 108 and a signal from the scanning probe microscope 107, until the signal from the spectrometer and the signal from the scanning probe microscope repeatedly change within an acceptable time delay while the focal point and the probe tip traverse edges of the topographic structure. In one or more embodiments the acceptable time delay is such that the signal from the spectrometer and the signal from the scanning probe microscope are substantially matched in time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
adjusting a focal length of a laser beam until a signal from a spectrometer repeatedly exhibits a stepped response when a focal point of the laser beam traverses an edge of a two-dimensional Raman scatterer; and
adjusting relative lateral positions of a scanning probe microscope probe tip and the focal point of the laser beam until the signal from the spectrometer and a signal from the scanning probe microscope repeatedly change within an acceptable time delay while the focal point and the probe tip traverse edges of a well-defined topographic structure.

2. The method of claim 1 further comprising:
installing a calibration apparatus on a sample platform of the scanning probe microscope, wherein the calibration apparatus comprises a substrate, the two-dimensional Raman scatterer that is mounted on an upper surface of the substrate, and the well-defined topographic structure that is formed at the upper surface of the substrate;
focusing the laser beam at the focal point near the upper surface of the substrate;
positioning and activating the spectrometer to detect light scattered from the focal point;
observing the signal from the spectrometer, while repeatedly traversing the focal point across an edge of the two-dimensional Raman scatterer and adjusting the focal length of the laser beam;
positioning a probe tip of the scanning probe microscope near to the upper surface of the substrate and laterally adjacent to the focal point; and
observing the signal from the spectrometer and the signal from the scanning probe microscope, while traversing the topographic structure with the probe tip and the focal point and adjusting the relative lateral positions of the probe tip and the focal point.

3. The method of claim 2 wherein the topographic structure is periodic.

4. The method of claim 1 further comprising repeatedly traversing the topographic structure.

5. The method of claim 1 further comprising estimating an angular orientation of the calibration apparatus with reference to a traversal direction of the probe tip and the focal point.

6. The method of claim 1 wherein the acceptable time delay is such that the signal from the spectrometer and the signal from the scanning probe microscope are substantially matched in time.

7. A computer readable storage medium encoded with instructions that when executed by a processor cause the processor to facilitate:

adjusting a focal length of a laser beam and traversing a focal point of the laser beam across an edge of a two-dimensional Raman scatterer while observing a signal from a spectrometer, until the signal from the spectrometer repeatedly exhibits a stepped response when the focal point traverses the edge of the two-dimensional Raman scatterer; and traversing a probe tip of a scanning probe microscope and the focal point of the laser beam across a well-defined topographic structure and adjusting the relative lateral positions of the probe tip and the focal point, while observing the signal from the spectrometer and a signal from the scanning probe microscope, until the signal from the spectrometer and the signal from the scanning probe microscope repeatedly change within an acceptable time delay while the focal point and the probe tip traverse edges of the topographic structure.

8. The computer readable storage medium of claim 7 wherein the acceptable time delay is such that the signal from the spectrometer and the signal from the scanning probe microscope are substantially matched in time.

* * * * *